(12) United States Patent
Rush

(10) Patent No.: US 6,230,222 B1
(45) Date of Patent: May 8, 2001

(54) PRIORITIZING INPUT DEVICE HAVING A CIRCUIT INDICATING THE HIGHEST PRIORITY KEY VALUE WHEN A PLURALITY OF KEYS BEING SIMULTANEOUSLY SELECTED

(76) Inventor: Martha Torell Rush, 485 Amberwood, Auburn Hills, MI (US) 48326-1129

( * ) Notice: Subject to any disclaimer, the term of this patent is extended or adjusted under 35 U.S.C. 154(b) by 0 days.

(21) Appl. No.: 09/182,847

(22) Filed: Oct. 29, 1998

(51) Int. Cl.$^7$ .................................................. G06F 13/10
(52) U.S. Cl. ................................................ 710/67; 341/22
(58) Field of Search .............................. 341/22; 84/1.01; 710/40, 15, 62, 67; 364/234; 708/142

(56) References Cited

U.S. PATENT DOCUMENTS

| | | | |
|---|---|---|---|
| 3,981,217 | * | 9/1976 | Oya ........................................ 84/1.03 |
| 4,170,768 | | 10/1979 | Kitagawa . |
| 4,293,849 | | 10/1981 | Lacy . |
| 4,321,850 | * | 3/1982 | Oya et al. ............................... 84/1.01 |
| 4,346,369 | | 8/1982 | Macy . |
| 4,424,732 | * | 1/1984 | Imamura et al. ...................... 84/1.17 |
| 4,513,394 | | 4/1985 | Deyer . |
| 4,570,154 | | 2/1986 | Kinghorn, et al. . |
| 4,651,611 | | 3/1987 | Deforeit . |
| 4,674,382 | * | 6/1987 | Yorihisa ................................. 84/1.01 |
| 4,679,030 | | 7/1987 | Volnak . |
| 4,704,932 | * | 11/1987 | Mishima ................................ 84/1.03 |
| 4,804,279 | | 2/1989 | Berkelmans et al. . |
| 4,833,446 | * | 5/1989 | Eilam et al. ............................ 341/22 |
| 4,964,075 | | 10/1990 | Shaver et al. . |
| 5,371,498 | * | 12/1994 | Kwon et al. ........................... 341/24 |
| 5,383,141 | | 1/1995 | Lapeyre . |
| 5,493,654 | * | 2/1996 | Gopher et al. ......................... 341/22 |
| 5,515,306 | | 5/1996 | Blaner et al. . |
| 5,523,521 | * | 6/1996 | Suzuki .................................... 84/615 |
| 5,535,421 | | 7/1996 | Weinreich . |
| 5,627,566 | | 5/1997 | Litschel . |
| 5,642,108 | | 6/1997 | Gopher et al. . |
| 5,661,476 | * | 8/1997 | Wang et al. ............................ 341/22 |
| 5,734,928 | * | 3/1998 | Nakasuji ................................ 395/887 |
| 5,841,374 | * | 11/1998 | Abraham ............................... 341/34 |
| 6,031,469 | * | 2/2000 | Dodd ...................................... 341/22 |

OTHER PUBLICATIONS

Thomas L. Floyd, Digital Fundamentals (4$^{th}$ ed. 1990) pp 266–269 & 470–471.
Peter Norton, "Inside the IBM PC", 1986, p. 44.*

* cited by examiner

Primary Examiner—Thomas Lee
Assistant Examiner—Thuan Du
(74) Attorney, Agent, or Firm—Reising, Ethington, Barnes, Kisselle, Learman & McCulloch, P.C.

(57) ABSTRACT

A prioritizing input device such as a keyboard (10) having a base (12) and a number of single column arrays (20) of individually actuable momentary keys (24). Within each array (20), the keys (24) are closely-packed together and are prioritized so that the user need not avoid simultaneously depressing multiple keys; rather, selection of a particular key requires only that the user avoid depressing a key that is higher priority than the desired key. The keyboard (10) can be used as a numeric input device such that each key (24) within an array (20) is assigned to a different digit. Priority among the keys (24) within each array (20) can be assigned in ascending numerical order so that pressing multiple keys will result in the numerically largest selected digit being recognized as the valid keypress. This permits the keys (24) within an array (20) to be small and closely packed together so that they are all accessible within the range of motion of an average user's finger. By providing an array on the keyboard for each finger, multi-digit numbers can be entered in a single operation by chording of the different arrays.

20 Claims, 3 Drawing Sheets

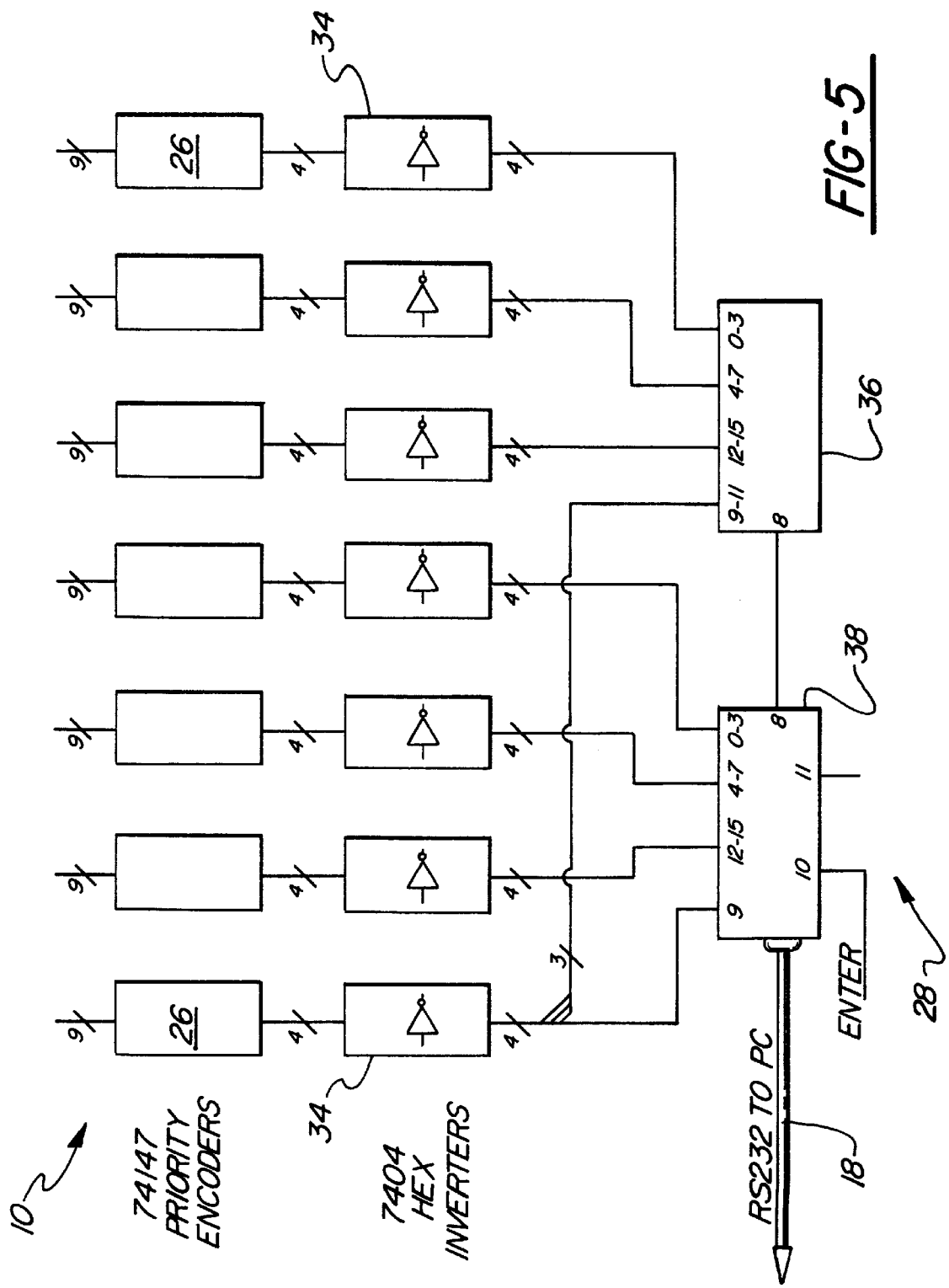

PRIORITIZING INPUT DEVICE HAVING A CIRCUIT INDICATING THE HIGHEST PRIORITY KEY VALUE WHEN A PLURALITY OF KEYS BEING SIMULTANEOUSLY SELECTED

TECHNICAL FIELD

The invention relates generally to electronic input devices for entering alphanumeric characters or strings and, more particularly, to prioritizing keyboards and chorded keyboards used to input information into a computer or other microprocessor based device.

BACKGROUND OF THE INVENTION

Mechanical and electronic alphanumeric input devices have traditionally been designed for sequential entry of characters using a keyboard having a number of momentary keys, each of which is used to input one or more of the characters. Since each key can be actuated independently of the other keys, some provision must be made for resolving between simultaneous activation of two or more the keys. As used herein in connection with the selection or activation of two or more keys, "simultaneous" or "simultaneously" will be understood to mean that the two or more keys are being held in their actuated state at the same time, regardless of whether they were switched into their actuated state at the same instant. In electronic keyboards, a number of different approaches have been utilized for handling simultaneous keypresses. For example, keyboards for standard personal computers typically use well known keyboard scanning techniques which permit determination of which of two simultaneously selected keys was pressed first. A signal indicative of the first key is then transmitted, followed by a signal indicative of the second key. Simultaneous selection of three or more keys is treated as an error condition that results in no valid keypress being recognized.

Another approach to resolving simultaneously selected keys is provided by U.S. Pat. No. 5,734,928 to Nakasuji, which discloses a portable information processing apparatus that resolves conflicts among simultaneously selected keypresses by determining which of the key codes associated with the depressed keys has the highest priority. This is accomplished using a microprocessor which, using the key codes for each of the simultaneously depressed keys, performs a table lookup in ROM to determine which of the key codes has the highest priority. That key code is then selected as the valid input from the keyboard.

Yet another approach is utilized in U.S. Pat. No. 4,346,369 to Macy which discloses a keyboard encoder-decoder circuit that utilizes priority encoders to resolve conflicts among simultaneous keypresses. The outputs of the encoders are representative of a single keypress and are latched, converted to serial data by a UART, and then transmitted via a line driver. The circuit includes a multi-key detector that disables the circuit when there are simultaneous keypresses. This is accomplished by a comparator which compares a reference voltage to a voltage that is dependent upon the number of keys being depressed. If two or more keys are simultaneously pressed, the comparator prevents the latching of the encoder output. Thus, there is no actual priority encoding of keys, since simultaneous key presses always result in disabling of the circuit.

In an effort to increase the speed, accuracy, and ease of data input over that permitted by the type of sequential input devices discussed above, various keyboard arrangements have been proposed which utilize different combinations of simultaneous keypresses to represent different characters or character strings. These types of input devices are commonly known as chording keyboards. One such example is found in U.S. Pat. No. 4,679,030 to Volnak which discloses a chording keyboard having ten keys, each of which corresponds to one bit in a ten-bit binary number. Different chorded combinations of the ten keys therefore generate different ten-bit binary numbers that are used to look up a corresponding character or character string in memory. Another example is provided by U.S. Pat. No. 5,535,421 to Weinreich which discloses a chord keyboard which uses one chord to select among different groups of characters or strings and a second chord to select one of the characters or strings from the selected group. The character or string selected by chording the keyboard is displayed and a separate action (such as simultaneous release of the keys) is then required to enter the selected character or string.

While these chording keyboard arrangements permit chorded inputs of not only individual characters, but strings as well, they are not suitable for simple entering of numbers having more than one or two digits, because either each possible number must be associated with a unique chording of the keyboard or the numbers must be built by sequential input of each digit of the number. Accordingly, there exists a need for a keyboard arrangement that permits single operation entry of multi-digit numbers.

SUMMARY OF THE INVENTION

In accordance with the invention, there is provided a prioritizing input apparatus that can be used in connection with a personal computer or other microprocessor-based device to permit data input into the device. The apparatus comprises an input device having a base and a group of keys supported by the base, with the keys being switchable between a non-actuated state and an actuated state in response to finger pressure from a user of the input device. The keys are momentary in operation and can be switched between the actuated and non-actuated states independently of actuation or non-actuation of any of the other keys in the group. Each of the keys have a different key value associated therewith, with the key values having a pre-selected ordering of priority. Each of the keys are operable in response to being switched from the non-actuated state to the actuated state to generate an input signal indicative of its key value. The input apparatus also includes an electronic circuit coupled to the keys. The circuit is operable in response to a plurality of the keys being simultaneously selected to provide an output signal indicative of the one of the selected keys having the highest priority key value associated therewith.

Preferably, the group of keys is configured as an array of closely-packed keys that can each be accessed by a single one of the user's fingers without requiring movement of the user's entire hand. The array of keys can be one of a number of such arrays that are spaced so that each array is accessible by a different finger on one or both of the user's hands. This permits not only prioritization among individual keys in an array, but chording of keys as well. To permit multi-digit numeric input, each array preferably has nine keys corresponding to the digits one through nine so that a multi-digit number can be input simply by simultaneously depressing the appropriate key from each of the arrays. The numeral zero can be represented by the absence of any keypress within an array. Within each array, the keys are prioritized, preferably by assigning priority in either ascending or descending numerical order. Since the keys in each array are prioritized, the nine keys can be closely-packed together and the user need not worry about depressing multiple keys simultaneously; rather, for ascending numerical prioritization the selection of a particular digit requires only that the user depress the desired key and refrain from depressing any key representing a higher digit. Thus, the simultaneous depression of keys representing digits that are numerically smaller than the desired digit will be ignored by the input device.

BRIEF DESCRIPTION OF THE DRAWINGS

A preferred exemplary embodiment of the present invention will hereinafter be described in conjunction with the appended drawings, wherein like designations denote like elements, and:

FIG. 5 is a schematic depicting an implementation of the keyboard of FIG. 1.

DESCRIPTION OF THE PREFERRED EMBODIMENT

Figure 1:
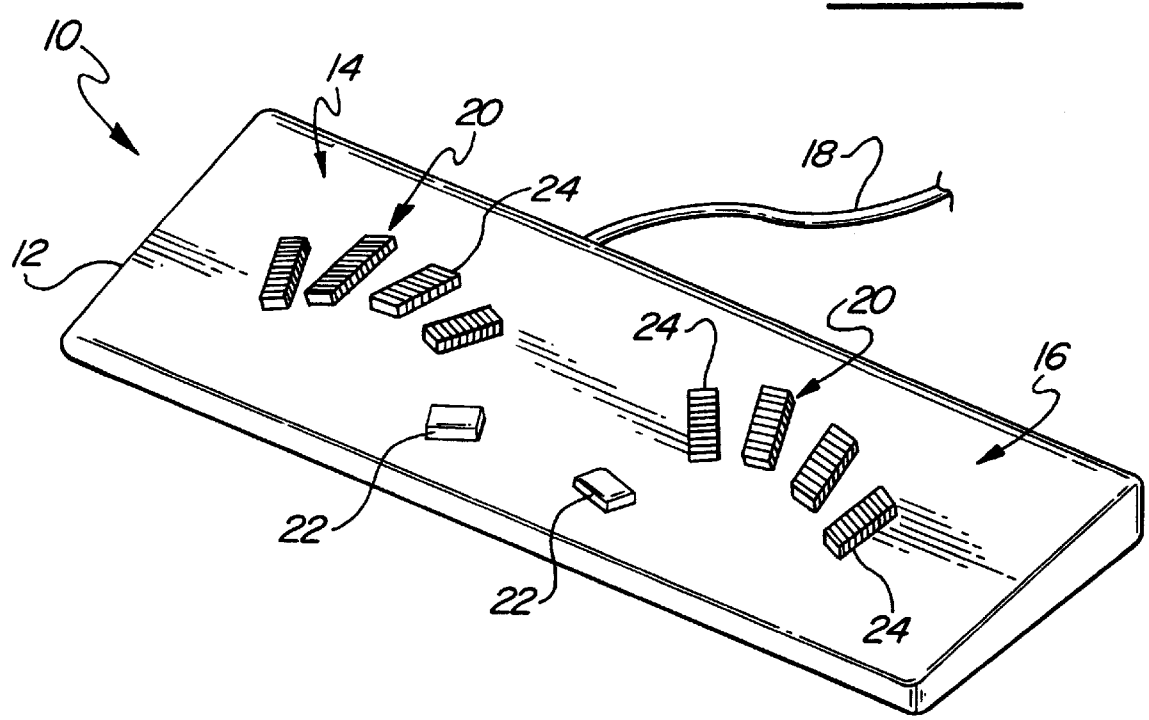
FIG. 1 is a perspective view of a numeric keyboard embodiment of a prioritizing input apparatus constructed in accordance with the present invention.

As shown in FIG. 1, a prioritized input apparatus of the invention can be implemented as a chording keyboard 10 having a base 12, a left hand keyset 14, a right hand keyset 16, and a serial cable 18 for connecting keyboard 10 to a general purpose computer (not shown). Each keyset 14, 16 comprises four prioritized arrays 20 and a thumb key 22, with each of the arrays 20 being arranged as a single column of individual keys 24. As depicted in FIG. 1, the spacing and positioning of each array corresponds to that of an average user's fingers so that each of the arrays is simultaneously accessible by the user. As with conventional keyboards, keys 24 are individually-actuable, momentary keys that can be depressed by finger pressure to thereby switch the key between a non-actuated state and an actuated state. Unlike conventional keyboards, however, keys 24 are relatively small in size and, within each array 20, are closely positioned together such that each key is within the range of motion of an average user's finger.

As will be described below, keyboard 10 can be used for numeric data input of multi-digit numbers, with each of the arrays 20 being used to input one of the digits of the multi-digit number. Rather than inputting the digits sequentially, keyboard 10 can be chorded so that the digits comprising the desired number are all input simultaneously. Thus, for an eight-array keyboard such as that shown in FIG. 1, any number having eight digits or less (e.g., any integer less than 100,000,000) can be input in a single operation. Each array has nine keys 24 representing the digits 1–9 and selection of a particular digit simply requires that the key corresponding to that digit be depressed.

Since within each array 20, the keys are relatively small in size and are positioned closely together, keyboard 10 includes circuitry that prioritizes among the different keys within any one array so that, if two or more keys within an array are depressed, only one key will be recognized as a valid keypress. In the illustrated embodiment, this is accomplished by assigning priority to the keys in ascending numerical order so that, within each array, the key corresponding to the numeral "9" has greater priority than the key corresponding to numeral "8", which has greater priority than the key corresponding to numeral "7", and so forth. Of course, priority could be assigned in descending numerical order or in any other manner desired.

Figure 2:
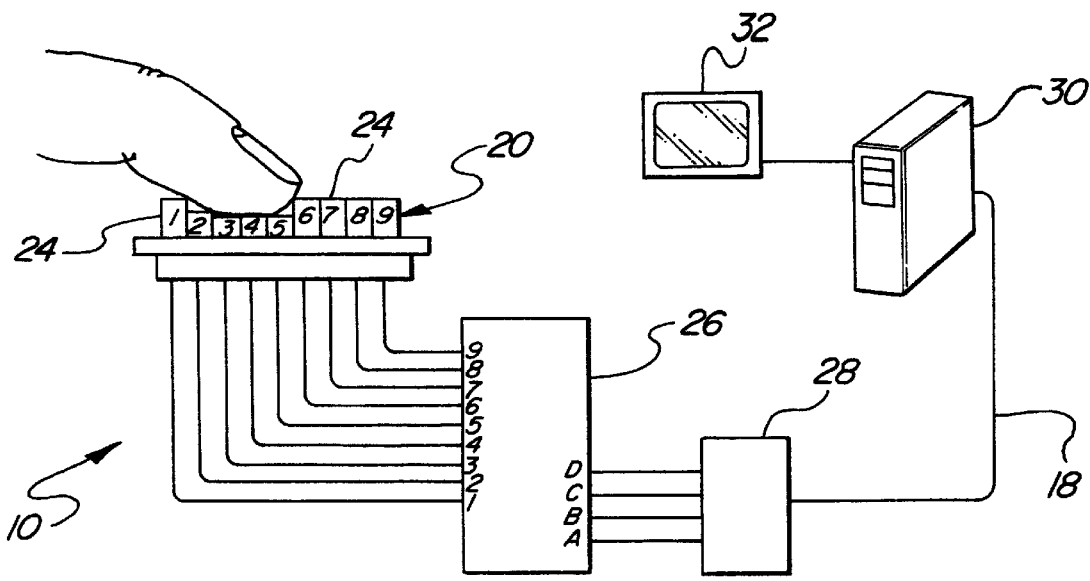
FIG. 2 depicts a single one of the prioritized arrays of the keyboard of FIG. 1 showing how priority among a plurality of simultaneously pressed keys is determined.

Referring now to FIG. 2, there is shown one technique for prioritizing among a plurality of simultaneous keypresses within a single one of the arrays 20. Each of the keys 24 is electrically connected to an input of a 74147 priority encoder 26. As is known, priority encoder 26 produces a BCD output corresponding to the decimal number associated with the activated input and, in the case of two or more inputs being simultaneously activated, prioritizes among the nine data inputs in ascending numerical order. Thus, as indicated in FIG. 2, to select the digit "5" all the user need do is depress the desired key (labelled "5") and refrain from depressing any key representing a numerically larger digit. The depicted simultaneous selection of keys representing numerals 2, 3, and 4 (which is virtually inevitable given the small size and close spacing of keys 24) will be ignored by priority encoder 26 such that the key corresponding to "5" is solely recognized as the valid keypress. Priority encoder 26 therefore generates a BCD output ("0101") that is provided to an interface circuit 28 which transmits the encoded character to a computer 30 via serial cable 18. Although the construction and operation of a suitable interface circuit 28 is well within the knowledge of one skilled in the art, an illustrative implementation of interface circuit 28 will be described further below in connection with FIG. 5.

Figure 3:
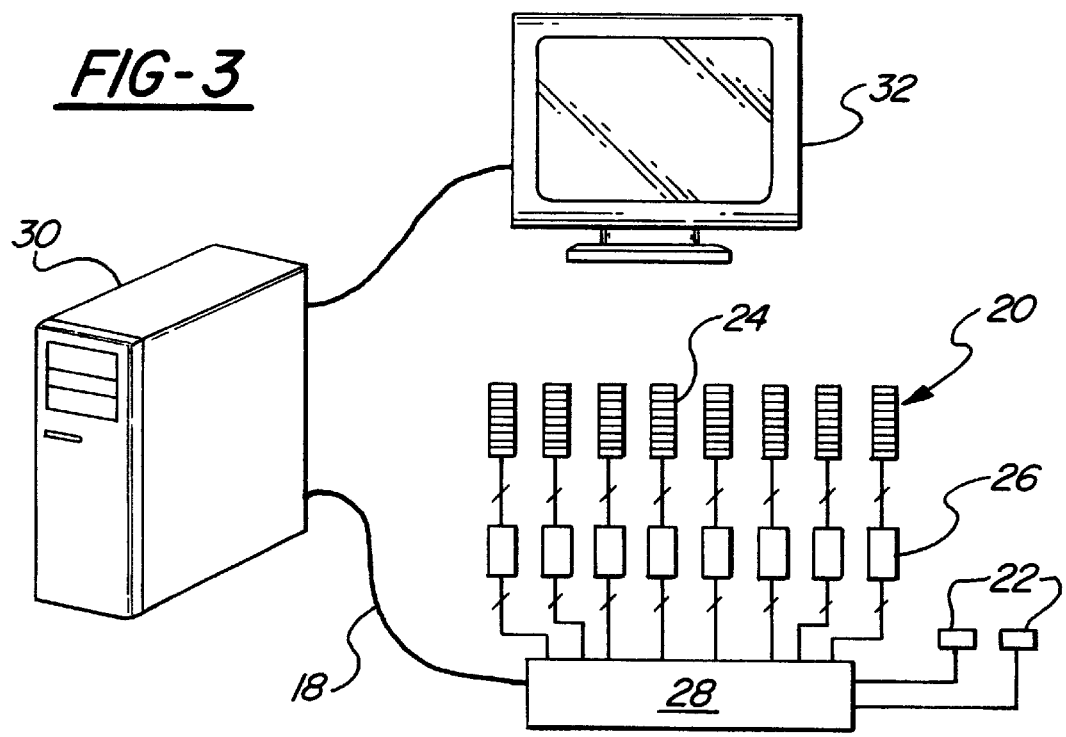
FIG. 3 is a block diagram of the circuitry used in the keyboard of FIG. 1.
Figure 4:
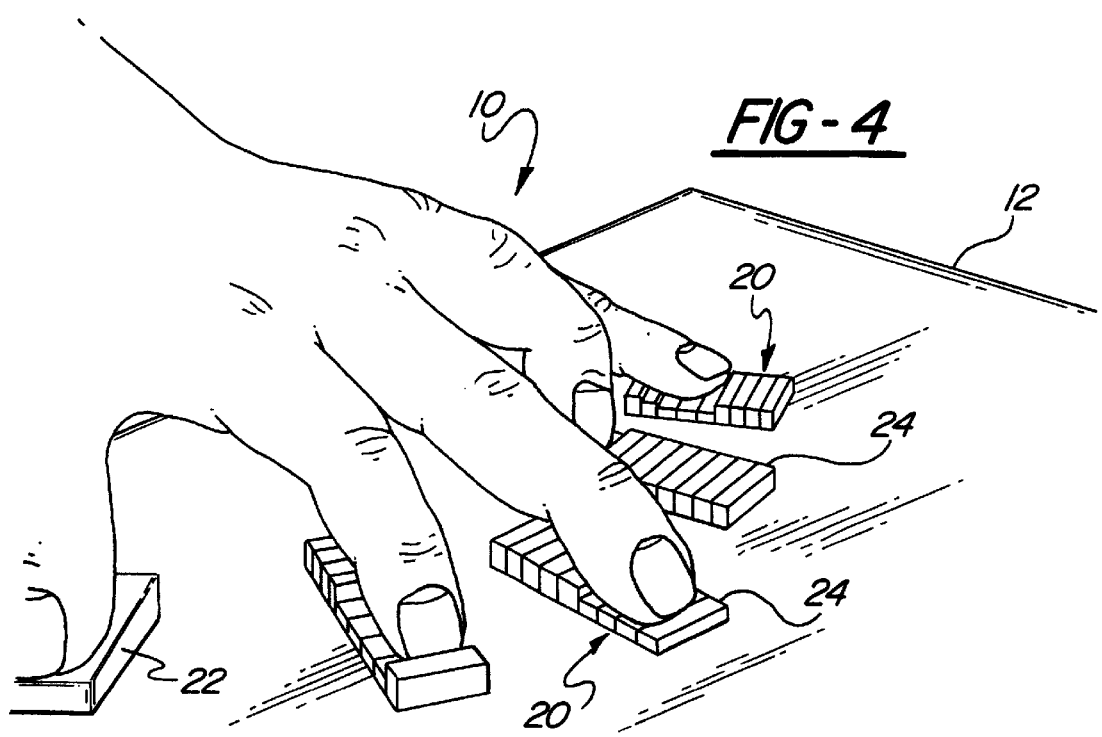
FIG. 4 is a perspective view showing how the keyboard of FIG. 1 can be chorded to produce a multi-digit number.

Thus, it will be appreciated that this combination of an array 20 of the keys 24 can be used along with priority encoder 26 to input a single digit. As shown in FIG. 3, this arrangement is used in conjunction with each of the arrays 20 to permit simultaneous input of more than one digit. In particular, within keyboard 10 each array 20 is connected to a corresponding priority encoder 26, the outputs of which are connected to the single interface circuit 28 which handles serial transmission of the digits to computer 30. By chording of the arrays 20, multiple digits can be simultaneously input to interface circuit 28, which then immediately transmits them to computer 30. This chording of the prioritized arrays is depicted in FIG. 4 which shows a user's left hand inputting the upper four digits (5-1-9-8) of an eight digit number. This arrangement is particularly useful for inputting numbers since, once the chording of the arrays is mastered by the user, large numbers can be entered in a single operation.

As mentioned above, each array 20 includes nine keys, one for each of the digits 1–9. While a tenth key can be included for entry of a zero, in the illustrated embodiment no additional key is necessary since the circuitry assumes that a zero is intended if no key in the array is selected. Thus, to enter the number "204", the first (right-most) array would have the number four selected, the second array would have no key selected, and the third array would have the number two selected. The remaining arrays need not be used, as they will be assumed by the circuit to be leading zeros that need not be entered. Apart from an optional zero key, each array could have a number of additional keys for the entry of other numerically-related inputs. For example, each array could include a decimal point key for entry of floating point numbers, in which case entry of a decimal point in a number would be accomplished by depressing the decimal point key in the appropriate array. As another example, keys corresponding to mathematical operators could be included in some of the arrays; e.g., a plus sign in one array, and a minus sign in another. Other such variations should become apparent.

One consideration unique to chorded input devices is that of distinguishing desired chorded combinations of keys from intermediate sub-combinations of the desired keys and from inadvertent combinations of other keys. That is, a user will most likely not depress all keys in the desired chord at the same instant, which will result in a sub-combination of the desired keys being selected for perhaps only a small fraction of a second. Alternatively, the user may initially chord a combination of keys and quickly realize that a different chording is desired and change to the desired chording. In either case it would be disadvantageous to recognize each of these initial chordings as an intended input. To prevent this occurrence keyboard 10 includes the thumb keys 22 for each of the two keysets 14, 16. For each keyset, once the desired chord has been selected, the thumb key for that keyset can be depressed to enter the chorded combination of digits. To assist in the selection of the chording necessary to achieve the desired input, the current result of any chorded combination of keys can be transmitted to computer 30 and, using suitable software, can be displayed by computer 30 on the computer monitor 32 (shown in FIG. 3) and only recognized by computer 30 as a valid entry once the thumb keys 22 have been depressed. Of course, only one thumb key 22 need be used for chording of both keysets 14, 16, in which case the other thumb key can be eliminated or can be used for other functions. Other techniques for signalling entry of the chorded combination of keys can be utilized. For example, as discussed in U.S. Pat. No. 5,535,421 to Weinreich, the disclosure of which is hereby incorporated by reference, the simultaneous or near simultaneous release of the chorded keys can be used to signal entry of the chord. Alternatively, as discussed in U.S. Pat. No. 5,627,566 to Litschel, the disclosure of which is also hereby incorporated by reference, keys having a separate triggering unit can be used so that a partial keypress of the keys displays the selected input and a complete (more forceful) keypress enters the selected input. Other arrangements will become apparent to those skilled in the art.

Turning now to FIG. 5, there is shown an implementation of keyboard 10 with interface circuit 28 being implemented using a pair of Basic Stamp II's, available from Parallax, Inc. of Rocklin, Calif. (www.parallaxinc.com). The embodiment shown is designed to accommodate seven of the eight arrays 20 such that any seven digit number can be produced using the circuitry of FIG. 5. Each of the 74147 priority encoders 26 is connected to receive the nine key inputs from the keys within its associated array (not shown). The priority encoders' inputs and outputs are active low so that a keypress can be signalled to the priority encoders by shorting the appropriate encoder input to ground via the key. The ten possible binary encoded output values of each encoder 26 are connected via four electrical conductors to 7404 hex inverters 34 which change the convention of the encoder outputs from active low to active high. Thus, each inverter 34 provides a four-bit (nibble) output in the range of 0000 through 1001. The outputs of the inverters 34 are connected to the Basic Stamps, referred to hereafter as interface modules 36, 38. The data provided by inverters 34 is assembled together by interface modules 36, 38 and then transmitted to computer 30.

Each of the interface modules 36, 38 has sixteen data I/O pins—enough for four of the seven, four-bit binary encoded digits. However, one data I/O pin is needed to transmit data between the two interface modules 36, 38. I/O pin 8 is used for this purpose, as indicated in FIG. 5. Thus, each of the two interface modules can accept only three full four-bit binary encoded digits. For interface module 36, one of the lower four-bit numbers (the least significant digit) is connected to I/O pins 0–3, another is connected to pins 4–7, and another is connected to pins 12–15. For interface module 38, one of the upper four-bit numbers is connected to I/O pins 0–3, another is connected to pins 4–7, and another is connected to pins 12–15. To accommodate the seventh digit (which, in the illustrated embodiment is the most significant digit), the four bits of data are split between the two interface modules with the least significant bit being connected to pin 9 of interface module 38 and the remaining three bits being connected to pins 9–11 of interface module 36. To signal entry of the chorded data, one of the thumb keys 22 (not shown) is connected to pin 10 of interface module 38. If desired, I/O pin 11 (shown unconnected) can be connected to the other thumb key 22 or can be used for other input.

Operation of the interface modules 36, 38 is as follows. Interface module 36 operates in a continuous loop in which it reads in each of the four-bit nibbles contained on I/O pins 0–3, 4–7, and 12–15, as well as the three bits of the most significant nibble using pins 9–11. The three full nibbles are each read in and assigned to byte variables. Each of the three bits of the most significant nibble are multiplied by their corresponding weighting, added together (i.e., the most significant bit multiplied by eight plus the second most significant bit multiplied by four plus the third most significant bit multiplied by two), and then assigned to a byte variable. The last step in the loop is to then send these four bytes to interface module 38 via I/O pin 8. Interface module 38 also operates in a continuous loop, as follows. First, it checks for input from interface module 36 and, if available, assigns the four received bytes of input to four byte variables. Then, it reads in the three full nibbles contained on its I/O pins 0–3, 4–7, and 12–15 and assigns them to byte variables. It also reads in the least significant bit of the most significant nibble on pin 9 and arithmetically adds this to the byte received from interface module 36 that represents the other three bits. The enter bit on pin 10 from thumb key 22 is also read in and assigned to a byte variable. Pin 11 can likewise be read and assigned to a variable, if desired. The last step in the loop is to transmit to computer 30 via cable 18 the seven byte variables representing the seven digits as well as the one byte representing the thumb key 22. These digits are then displayed on monitor 32 with leading zeros being ignored. If the byte representing thumb key 22 indicates that the thumb key was not pressed, then the number is merely displayed. However, if that byte indicates that thumb key 22 was pressed, then the number is also accepted by the computer as entered data.

Although the exemplary embodiment has been described using Basic Stamp II programmable modules, it will be appreciated that other techniques for assembling and transmitting the individual digits can be used. Moreover, prioritization by means other than the disclosed 74147 priority encoders could be used. For example, a table lookup in ROM could be used, such as is disclosed in U.S. Pat. No. 5,734,928 to Nakasuji, the disclosure of which is hereby incorporated by reference.

While keyboard 10 has been considered as a numeric input device, it could also be used for character or character string entry by assigning each of the millions of different possible multi-digit numbers to a different character or string. Thus, entire vocabularies of words can be made accessible by chording of keyboard 10. This can be implemented by alphabetical assignment of words to the different chorded numbers so that the user could have some sense of where to chord for a word. For example, words beginning with the letter "d" could be located in the range of, say 4,000–5,000 whereas words beginning with the letter "p" could be located somewhere around 18,000. Similarly, oriental languages, which typically have thousands of different characters, could be accommodated using keyboard 10 or some other arrangement of chorded priority arrays. Also, the vast number of possible chorded numbers makes it possible to provide different, redundant chordings for the same character or string to thereby help reduce repetitive stress injury.

Even more generally, prioritized chording using arrays of keys representing any alphanumeric characters is possible without departing from the scope of the invention. For example, the input apparatus can comprise a keyboard having one or more arrays of keys with each key having an associated key value (i.e., a character or character string, whether numeric or otherwise). The keys within any one array would have a pre-selected ordering of priority that is based upon their associated key values. For English alphabetical characters, such ordering could depend upon the character's order within the English alphabet or some other criteria, such as the frequency of usage of the particular letter. For alphanumeric characters generally, priority of each character could be determined based upon the ASCII value of the character, frequency of usage of the character, or other criteria. In this regard, the arrays need not be arranged as a single vertical column, but could be arranged in other ways.

The relative size of the individual keys 24 depicted in the various figures is exemplary only and it will be appreciated that the actual sizing of the keys can be selected as a trade off between minimizing the total range of motion required for the fingers and maximizing the ease of striking the desired keys. Preferably, each array 20 spans a total distance of less than or equal to about three inches. Indicia representing the key value of each key can be printed on or beside each key. Also, to permit tactile distinction between the keys, the key surfaces could be varied from key to key, such as with pebbling of the surfaces that becomes coarser within the array in ascending order of priority.

Other variations and uses of the disclosed chorded priority arrays will become apparent to those skilled in the art. For example, audio feedback of the result of a selected chorded input could be used in lieu of or in addition to the display on the computer monitor. Also, rather than implemented as a keyboard of momentary mechanical switches, a touch screen or other input technology could be utilized. In the case of a touch screen, the digits or other characters can be assigned to different regions on the screen.

It will thus be apparent that there has been provided in accordance with the present invention a prioritizing data input device which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, the size of the different arrays can be varied depending upon the relative ranges of motions of the different fingers. All such variations and modifications are intended to come within the scope of the appended claims.

I claim:

1. A prioritizing numeric data input apparatus that outputs numeric data selected by a user, comprising:

an input device having a group of different numeric digits associated therewith, said numeric digits being represented by indicia that are located on said input device in close proximity to each other and being selectable by a user via said input device, with said input device being responsive to the selection of one or more of said numeric digits to provide at least one input signal indicative of said selected numeric digits;

an electronic circuit coupled to said input device to receive said one or more input signals, said circuit being operable in response to a single one of said numeric digits being selected to provide an output signal indicative of that single selected numeric digit;

said circuit further being operable in response to a plurality of said numeric digits being simultaneously selected by the user to provide an output signal indicative of the numeric value of the largest of the numeric digits simultaneously selected by the user, whereby numerically larger digits are given priority over numerically smaller digits.

2. An input apparatus as defined in claim 1, wherein said input device comprises a plurality of individually-actuable keys, each of which is associated with a different one of said numeric digits and is switchable between a non-activated state and an activated state.

3. An input apparatus as defined in claim 2, wherein said plurality of keys comprise at least nine momentary keys physically arranged in numeric order according to the numeric digits assigned to each key, and wherein said indicia comprise numeric digits printed on each of said keys.

4. An input apparatus as defined in claim 3, wherein said keys are arranged as a single column array spanning a total distance of less than or equal to about three inches.

5. An input apparatus as defined in claim 2, wherein said circuit includes at least one input for each of said keys and wherein said circuit includes a priority encoder connected to receive said input signals from said keys, with said keys being connected to said priority encoder such that, upon selection of a plurality of said numeric digits by activation of a corresponding plurality of said keys, said priority encoder provides an encoded output representing the numerically largest selected digit.

6. An input apparatus as defined in claim 2, wherein said plurality of keys comprise a first group of keys and wherein said input device further comprises a second group of keys coupled to said circuit, each of said keys of said second group being associated with a different numeric digit and being switchable between an actuated state and a non-actuated state, wherein said input device is operable in response to selection of one or more of said keys of said second group to provide at least one input to said circuit that is separate from any input received from said first group of keys; and wherein said circuit is operable in response to simultaneous selection of two or more keys from said second group to provide an output signal indicative of the largest of the numeric digits associated with the selected keys.

7. An input apparatus as defined in claim 6, wherein said circuit is operable in response to simultaneous selection of at least one key from each of said first and second groups to generate a two-digit number.

8. An input apparatus as defined in claim 1, wherein said input device comprises a touch sensitive device having a plurality of regions, each of which corresponds to a different one of said numeric digits.

9. A prioritizing data input apparatus for use in connection with a microprocessor-based device to permit data input to the microprocessor-based device, the input apparatus comprising:

an input device having a base portion and a group of keys supported by said base portion, said keys being switchable between a non-actuated state and an actuated state in response to finger pressure from a user of said input device, said keys being momentary in operation such that said keys are in said actuated state only when pressure is applied to said keys, said keys further being operable between said actuated and non-actuated states independently of actuation or non-actuation of any of the other keys in said group;

each of said keys having a different key value associated therewith, with said key values having a pre-selected ordering of priority, wherein each of said keys are operable in response to being switched from said non-actuated state to said actuated state to generate an input signal indicative of its key value; and an electronic circuit coupled to said keys, said circuit being operable in response to a plurality of said keys being simultaneously selected by the user to provide an output signal indicative of the one of said selected keys having the highest priority key value associated therewith, wherein said output signal is the only user-selected data that is outputted as a result of the user's simultaneous selection of said selected keys.

10. An input apparatus as defined in claim 9, wherein said key values comprise numeric digits and wherein said key values are prioritized in ascending numerical order, whereby numerically larger digits are given priority over numerically smaller digits.

11. An input apparatus as defined in claim 10, wherein said group of keys are physically arranged as a single column array with said keys being arranged within said array in numerical order according to their associated key value.

12. An input apparatus as defined in claim 9, wherein said group of keys comprise a first group of keys physically arranged as a first array with said keys being arranged within said first array in order according to the priority of their associated key values.

13. An input apparatus as defined in claim 9, further comprising a second group of momentary keys physically arranged as a second array located adjacent said first array, said keys of said second group each having a key value associated therewith and being switchable between non-actuated and actuated states, wherein said key values have a pre-selected order of priority with said keys of said second group being arranged in order according to the priority of their associated key values, wherein said keys of said second group are in response to being switched from said non-actuated state to said actuated state to generate an input signal indicative of its key value, and wherein said circuit is operable in response to a plurality of said keys of said second group being simultaneously selected to provide an output signal indicative of the one of said selected keys having the highest priority key value associated therewith.

14. An input apparatus as defined in claim 13, wherein said circuit is operable in response to at least one key from said first group of keys being selected simultaneously with at least one key from said second group of keys to produce an output uniquely determined by the combination of highest selected key values from each of said first and second groups.

15. An input apparatus as defined in claim 14, wherein said circuit includes a commit input coupled to said input device and wherein said circuit is operable to enter said uniquely determined output in response to receiving a signal on said commit input.

16. An input apparatus as defined in claim 9, wherein each of said keys is electronically coupled to said circuit, with said keys each providing one of said input signals to said circuit upon switching from said non-activated state to said activated state.

17. An input apparatus as defined in claim 16, wherein said circuit includes an input for each of said keys and wherein said circuit includes a priority encoder connected to receive said input signals from said keys, with said keys being connected to said priority encoder such that, upon simultaneous selection of a plurality of said keys, said priority encoder provides an encoded output representing the highest priority key value of those key values associated with the selected keys.

18. An input apparatus as defined in claim 9, wherein said keys are arranged as a single column array.

19. An input apparatus as defined in claim 18, wherein the length of said array is less than or equal to about three inches.

20. A chorded keyboard, comprising:

a base;

a number of groups of keys supported by said base, each of said groups of keys including a plurality of keys that are switchable between a non-actuated state and an actuated state in response to finger pressure from a user, said keys being momentary in operation such that said keys are in said actuated state only when pressure is applied to said keys, said keys further being operable between said actuated and non-actuated states independently of actuation or non-actuation of any of the other keys in any of said groups;

wherein, within each of said groups, each key has a different key value associated therewith, with said key values having a pre-selected ordering of priority within each group, wherein each of said keys are operable in response to being switched from said non-actuated state to said actuated state to generate an input signal indicative of its key value; and an electronic circuit coupled to said keys, said circuit being operable in response to a plurality of said keys within any one group being simultaneously selected to provide an output signal indicative of the one of said selected keys having the highest priority key value associated therewith;

wherein each of said groups of keys are arranged in an array separate from said other groups of keys, with each array being located adjacent at least one other array such that adjacent arrays are simultaneously accessible by adjacent fingers on a user's hand, and wherein the keys within each array are organized in order according to the priority of their associated key values, whereby said arrays each comprises a prioritized array that together can be chorded by a user.

* * * * *

UNITED STATES PATENT AND TRADEMARK OFFICE
CERTIFICATE OF CORRECTION

PATENT NO. : 6,230,222 B1
DATED : May 8, 2001
INVENTOR(S) : Martha Torell Rush

It is certified that error appears in the above-identified patent and that said Letters Patent is hereby corrected as shown below:

<u>Title page,</u>
Item [54], line 4, delete "BEING" and insert therefor -- ARE --.

Signed and Sealed this

Nineteenth Day of March, 2002

Attest:

JAMES E. ROGAN
*Director of the United States Patent and Trademark Office*

*Attesting Officer*